United States Patent [19]
McNinch, Jr.

[11] Patent Number: 5,398,790
[45] Date of Patent: Mar. 21, 1995

[54] INTERNAL SHOE DRUM BRAKE

[75] Inventor: Joseph H. McNinch, Jr., Livonia, Mich.

[73] Assignee: Lucas Industries, England

[21] Appl. No.: 138,797

[22] Filed: Oct. 18, 1993

[30] Foreign Application Priority Data

Oct. 22, 1992 [GB] United Kingdom ............... 9222302

[51] Int. Cl.6 ............................................. F16B 51/00
[52] U.S. Cl. .................................. 188/328; 188/79.51
[58] Field of Search ............... 188/328, 325, 326, 327, 188/341, 79.51

[56] References Cited

U.S. PATENT DOCUMENTS

| | | | |
|---|---|---|---|
| 2,195,261 | 3/1940 | Rasmussen et al. | 188/327 X |
| 2,311,765 | 2/1943 | Loweke | 188/327 |
| 3,973,655 | 8/1976 | Mollard | 188/328 |
| 4,526,254 | 7/1985 | Baltare | 188/328 X |
| 5,044,475 | 9/1991 | Clark | 188/330 |
| 5,159,998 | 11/1992 | Copp et al. | 188/328 X |

FOREIGN PATENT DOCUMENTS

| | | |
|---|---|---|
| 1814370 | 7/1970 | Australia . |
| 0006405 | 1/1980 | European Pat. Off. . |
| 0543547 | 5/1993 | European Pat. Off. . |
| 1462836 | 1/1966 | France . |
| 1154727 | 9/1963 | Germany ............... 188/328 |
| 3320718 | 6/1983 | Germany . |
| 0637722 | 4/1962 | Italy ....................... 188/341 |
| 46-1931 | 7/1966 | Japan ..................... 188/341 |

Primary Examiner—Robert J. Oberleitner
Assistant Examiner—Peter M. Poon
Attorney, Agent, or Firm—Andrus, Sceales, Starke & Sawall

[57] ABSTRACT

An internal shoe drum brake has a pair of brake shoes mounted on a backplate with one pair of adjacent shoe ends in sliding engagement with an abutment fixed to or integral with the backplate. An actuator disposed between the other pair of adjacent shoe ends is operable to move the shoes, in use, into braking engagement with the braking surface of the rotary brake drum. At least the actuator or abutment is provided with shoe tip engagement surfaces of arcuate form and the respective engaging shoe tips have a generally complementary arcuate form resulting in a generally even wear pattern for the shoes.

9 Claims, 2 Drawing Sheets

INTERNAL SHOE DRUM BRAKE

This invention relates to an internal shoe drum brake of the leading/trailing or simplex type in which a pair of brake shoes is mounted on a backplate with one pair of adjacent shoe ends in sliding engagement with an abutment fixed to or integral with the backplate, and an actuator is disposed between the other pair of adjacent shoe ends and operable to move the shoes, in use, into braking engagement with a braking surface of a rotary brake drum.

The wear characteristics of some conventional simplex brakes are inherently uneven because the leading shoe tends to wear the more rapidly due to the servo effect of the rotating drum thereon. Because the shoes can slide relative to the fixed abutment, they are able to achieve some conformability between the lining and drum, which enables them to compensate, to some extent, for drum ovality and eccentricity. However, the abutment angles, which are a major factor influencing the wear characteristics of the lining, are chosen according to the desired brake geometry and performance. Since these angles remain constant throughout the life of a lining, it is difficult to balance satisfactorily the often conflicting requirements of ideal wear characteristics and optimum geometry and performance.

An object of the present invention is to provide an internal shoe drum brake of the simplex type in which the effective abutment angles can vary in use, according to the wear experienced by the shoes and thereby tend to correct any imbalance in lining wear across each of the shoes.

According to the invention, the fixed abutment and/or actuator of an internal shoe drum brake of the simplex type is provided with shoe tip engagement surfaces of arcuate form and the respective engaging shoe tips have a generally complementary arcuate form.

Typically, each engagement surface on the abutment and each shoe tip is of constant radius. Conveniently, the radius of each shoe tip is different from that of the associated engagement surface, the shoe tip radii being, typically, greater than those of the engagement surfaces.

Preferably, the arc of one of the engagement surfaces on the abutment is generated from a point on a datum line extending between the shoes perpendicularly to the centre line of the brake, and the arc of the other engagement surface thereof from a point on a line angularly displaced from the datum line, typically by 20°.

The invention will now be described, by way of example, with reference to the accompanying drawings in which.

Figure 1:
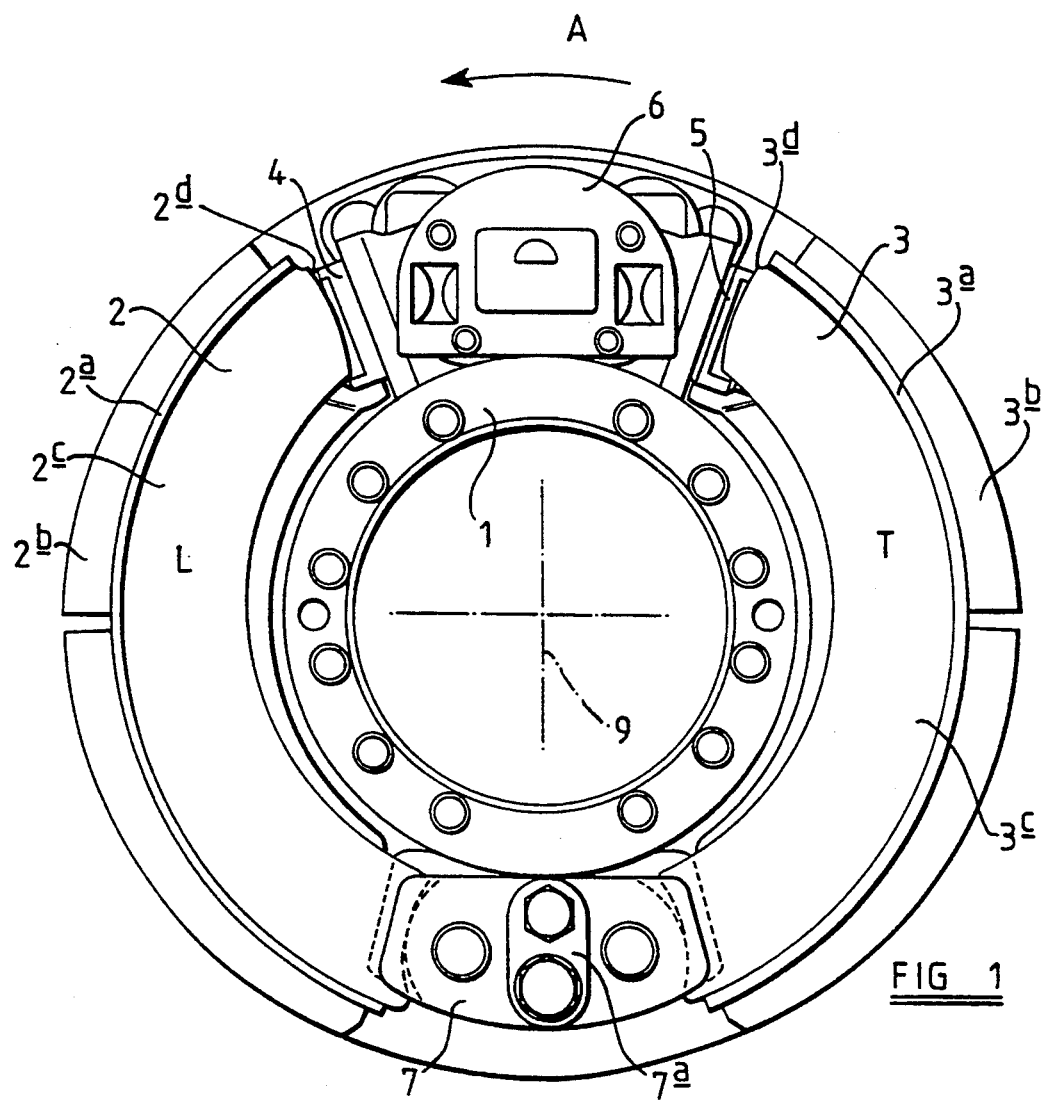
FIG. 1 is a front view of one form of the internal shoe drum brake of the invention.
Figure 2:
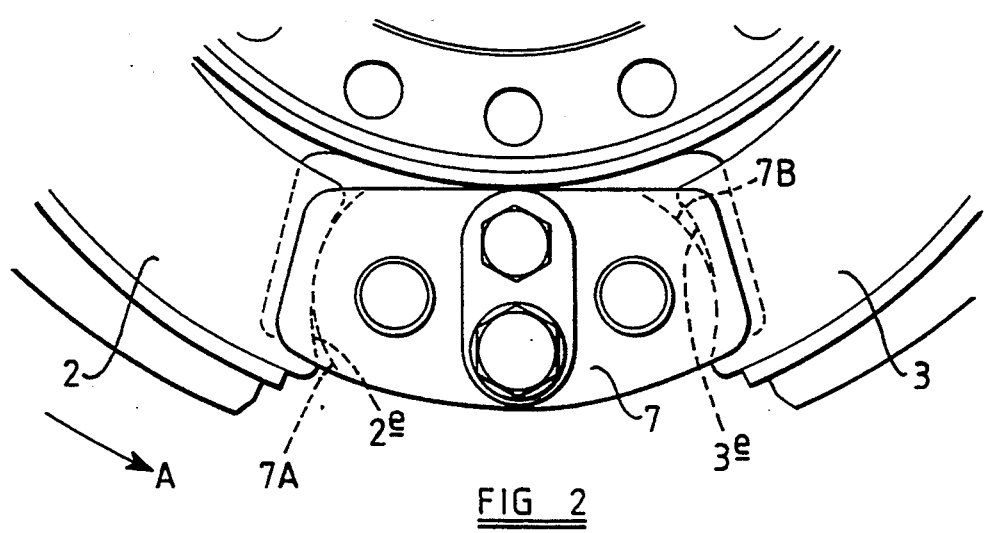
FIG. 2 is a detail, to an enlarged scale, of part of the drum brake of FIG. 1, and FIGS. 3 and 4 are diagrammatic illustrations of part of the brake of FIGS. 1 and 2, illustrating the brake in alternative conditions.

The internal shoe drum brake illustrated in FIGS. 1 and 2 of the drawings is of the simplex configuration, having a backplate 1, upon which are mounted brake shoes 2 and 3, each having a platform 2a, 3a carrying a lining of friction material 2b, 3b on the outer face thereof, the inner face of each platform having a web 2c, 3c extending perpendicularly from approximately the widthwise centre of the platform, in conventional manner. The thickness profile of the linings 2b, 3b is identical, being chosen to provide the required wear life. The outer ends of the webs form shoe tips, of which those 2d, 3d respectively engage tappet heads 4, 5 forming part of an actuator 6 operable to expand the shoes outwardly into braking engagement with a surrounding rotary brake drum (not shown). The forward direction of drum rotation is indicated by arrow A. The shoe tips 2e, 3e at the other ends of the webs engage an abutment device 7, which is fixed to or integral with the backplate 1 and serves to react the torque forces imparted to the shoes by the drum during braking. It can be seen more clearly from FIG. 2 that the abutment has a pair of oppositely facing convex abutment surfaces 7A, 7B engaged by shoe tips 2d, 3d, which are of generally complementary concave form. In the illustrated brake, the leading shoe is designated L and the trailing shoe T.

Figure 3:
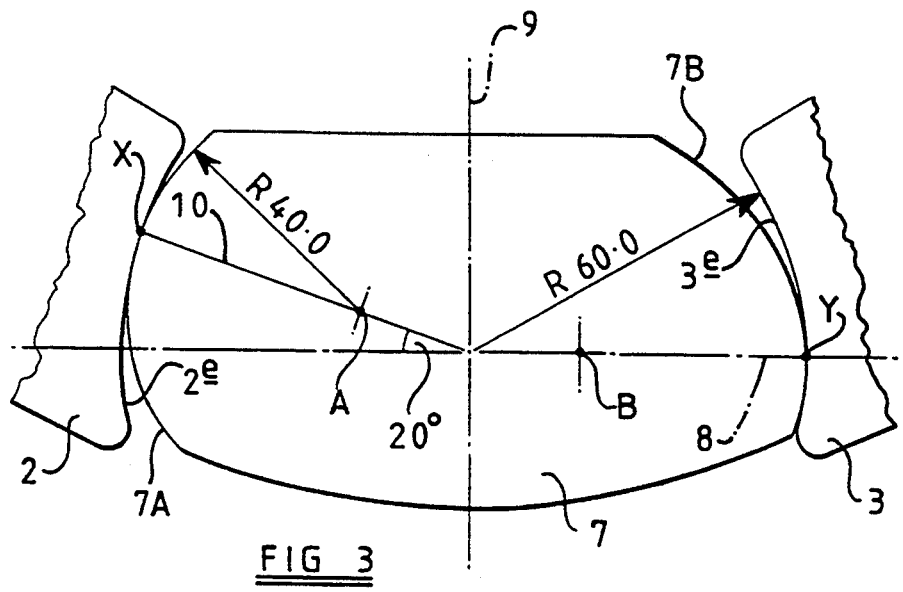

FIG. 3 is a simplified diagrammatic illustration showing details of the geometrical relationship between the shoe tips and abutment surfaces for the new lining condition of the shoes. The abutment surfaces 7A, 7B are of equal radius 40 mm and struck from centres A and B. Centre B lies on a datum line 8 extending between the shoes at right angles to the brake centre line 9, whereas centre A lies on a line 10 upwardly angularly displaced from the datum 8 by 20°. The arcs of the shoe tips are again of equal radius 60 mm, but have a common centre at the intersection between the brake centre line 9 and datum line 8. In this embodiment, the arrangement is such that, in the unworn condition of the brake illustrated in FIG. 3, the point of contact Y of the shoe 3 with the abutment surface 7 is on the datum line 8, while the point of contact X of the shoe 2 with the abutment surface 7A is at a location intersected by the line 10 displaced by 20° from the datum line 8. The values are chosen to produce a contact stress approximately equivalent to a 100 mm radius on a flat surface abutment and also for convenience of layout. These values provide effective abutment angles of 20° for the leading shoe L and 0° for the trailing shoe T, although it should be understood that these are merely typical examples and may be varied as required.

During operation of the brake, a shoe tip end of one or both shoe linings may wear more quickly than the central part of the lining and the use of the convex abutments and concave shoe tips provides an in-built tendency in the brake to compensate for imbalanced wear. For example, if excessive wear takes place at the abutment end of the leading shoe L, the shoe slides around the abutment, increasing the effective abutment angle which has the compensatory effect of increasing wear at the tappet end of the shoe, thereby returning the shoe towards its original position on the abutment. For leading and trailing shoes fully worn at their abutment ends, the leading shoe and trailing shoe abutment angles may increase to 26° and 5° respectively. The shoe may be thereby constrained to assume a more or less even wear pattern.

Conversely, if the excessive wear takes place at the tappet end of the shoe, the shoe will move around the abutment, thereby decreasing the effective abutment angle, and causing the shoe to return towards the aforesaid original position. The wear compensation described for the leading shoe also applies to the trailing shoe. For example, under these conditions, the leading and trailing abutments may decrease to −1° and −15° respectively. In brakes having different abutment angles for the two shoes, the convex abutment and concave shoe tip provides essentially equal wear on the two shoes.

Figure 4:
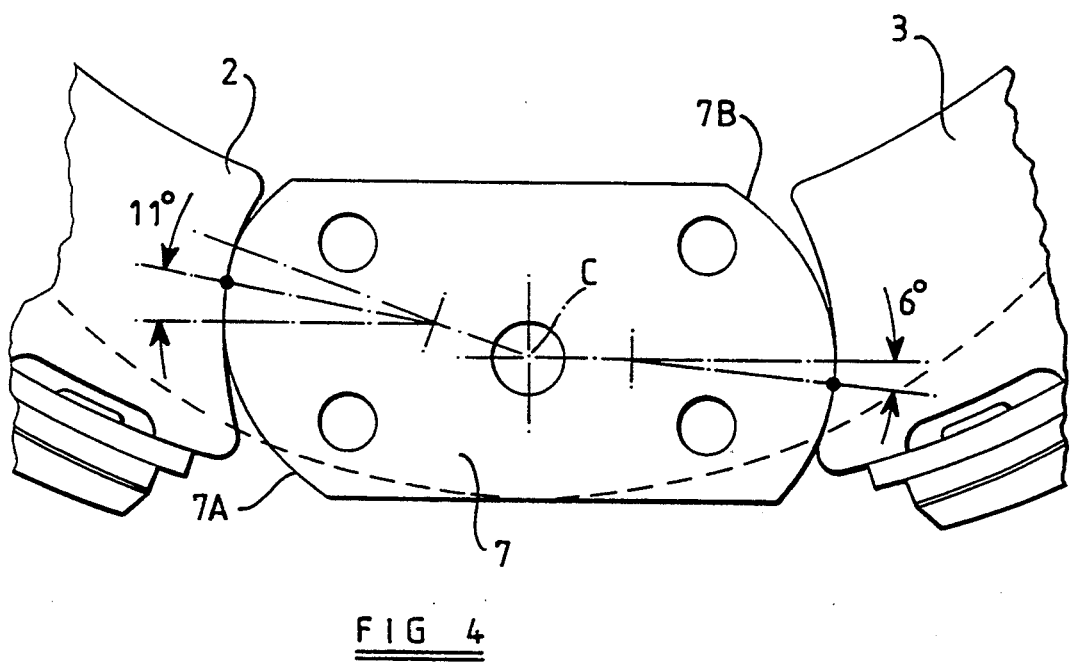

As overall wear of the shoes takes place, the leading shoe L will tend both to rotate about the centre C and also slide downwardly on the abutment surface 7A. The trailing shoe T will also tend to rotate about the centre C and slide downwardly on the abutment surface 7B. In their condition fully worn at the centre, therefore, the shoes will reach final positions on the abutments such as those shown in FIG. 4 for example.

It will be understood that the positive and negative abutment angles referred to above refer respectively to angles measured respectively above and below the datum line 8.

One result of the arcuate abutment/shoe tip arrangement is that the combined shoe forces produce a resultant force passing through the centre of the abutment 7, which provides an additional advantage that the bending forces on the torque plate are reduced and, more importantly, little or no tilting force is applied to the abutment. Moreover, by varying the radii of the shoe tips and/or abutment surfaces, the contact stress can be reduced to as little as 50% of that found in some conventional shoe/abutment configurations. Appropriate variations of the radii may also make it possible to provide a universal abutment operating with a range of lining friction coefficients.

By making the shoe tips of each shoe identical, and using identical linings as illustrated, it would be possible to provide a shoe which is interchangeable as between the actuator and abutment ends of the brake, as well as from side to side thereof. The manufacture of a brake incorporating such shoes is considerably facilitated by the reduction in parts and the chance of incorrect assembly of the shoes in the brake is very much reduced as a result of the interchangeability of the shoes.

It will be understood that the invention can be applied to the actuator end of the shoes alternatively or in addition to the abutment arrangement described above. The arcuate surfaces of the actuator would be typically provided on the ends of hydraulically operated tappets or embodied in the usual cam surface of a cam actuator, for example.

I claim:

1. An internal shoe drum brake comprising a pair of brake shoes mounted on a backplate with one pair of adjacent shoe ends in sliding engagement with an abutment fixed to or integral with the backplate, and an actuator disposed between the other pair of adjacent shoe ends and operable to move the shoes, in use, into braking engagement with the braking surface of a rotary brake drum, at least one of the fixed abutment and actuator being provided with shoe tip engagement surfaces of arcuate form and the respective engaging shoe tips having a generally complementary arcuate form, and wherein the radius of each engaging shoe tip is different from that of the associated engagement surface.

2. A brake according to claim 1, wherein each engagement surface of the abutment is of constant radius.

3. A brake according to claim 1, wherein each engaging shoe tip is of constant radius.

4. A brake according to claim 1, wherein the radius of each shoe tip is greater than that of the associated abutment surface.

5. A brake according to claim 1, wherein both shoes have the same shoe tip radius.

6. A brake according to claim 1, wherein both abutment engagement surfaces have the same radius.

7. A brake according to claim 1, wherein the arc of one of the engagement surfaces on the abutment is generated from a point on a datum line extending between the shoes perpendicularly to the centre line of the brake, and the arc of the other engagement surface from a point on a line angularly displaced from the datum line.

8. A brake according to claim 7, wherein the angle of displacement of said line from the datum line is 20°.

9. A brake according to claim 1, wherein the engagement surfaces on the abutment are convex and the shoe tips are concave.

* * * * *